United States Patent [19]
Laskaris

[11] 3,831,050
[45] Aug. 20, 1974

[54] ROTOR FOR A DYNAMOELECTRIC MACHINE

[75] Inventor: Evangelos T. Laskaris, Schenectady, N.Y.

[73] Assignee: General Electric Company, Schenectady, N.Y.

[22] Filed: Sept. 17, 1973

[21] Appl. No.: 398,211

[52] U.S. Cl..................... 310/270, 310/61, 310/262
[51] Int. Cl............................ H02k 3/46, H02k 1/32
[58] Field of Search............. 310/52, 58, 60, 61, 62, 310/63, 261, 262, 270

[56] References Cited
UNITED STATES PATENTS

| | | | |
|---|---|---|---|
| 1,150,043 | 8/1915 | Lamme............................ | 310/270 X |
| 2,519,219 | 8/1950 | Baudry et al....................... | 310/270 |
| 3,034,003 | 5/1962 | Seidner.............................. | 310/61 |
| 3,098,941 | 7/1963 | Willyoung.......................... | 310/61 X |
| 3,322,985 | 5/1967 | Azbukin et al. ................... | 310/61 |
| 3,395,299 | 7/1968 | Quay et al. ........................ | 310/61 X |

*Primary Examiner*—Mark O. Budd
*Attorney, Agent, or Firm*—John F. Ahern; James W. Mitchell

[57] ABSTRACT

A rotor for a dynamoelectric machine is formed of a rotor body and a rotor spindle having a smaller diameter than the rotor body. A plurality of coils are provided, each having side portions, offset portions, and arcuate end portions. Each offset portion includes a radially directed portion and a downset portion. The side portions are disposed in axial slots in the rotor body. The downset portions and arcuate end portions extend axially and circumferentially along the rotor spindle, respectively, with the arcuate end portions disposed in slots formed by circumferentially directed flanges on the rotor spindle. The radially directed portions provide a current path between respective side portions and downset portions. The radial distance to the outside of the downset portions, the outer radius of the arcuate end portions and the outer radius of the circumferentially directed flanges is substantially the same, so that inner retaining ring means may be installed over the circumferentially directed flanges in order to restrain the arcuate end portions and downset portions against centrifugal force as the rotor turns. An outer ring is installed over the end of the rotor body and a portion of the inner retaining ring means in order to restrain the radially directed portions against centrifugal force as the rotor turns.

11 Claims, 5 Drawing Figures

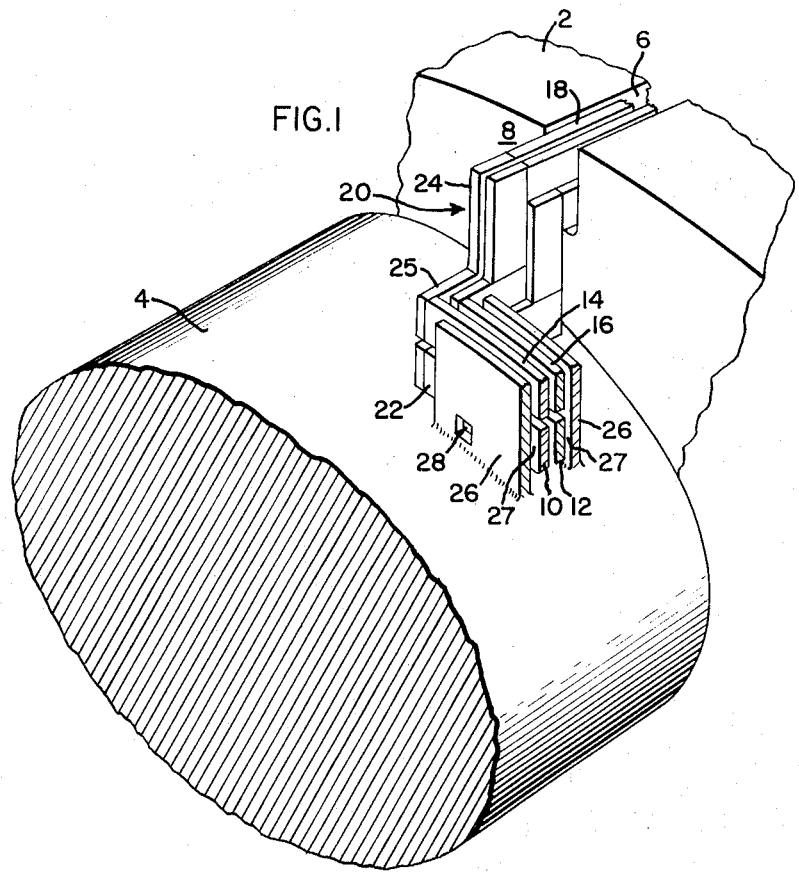
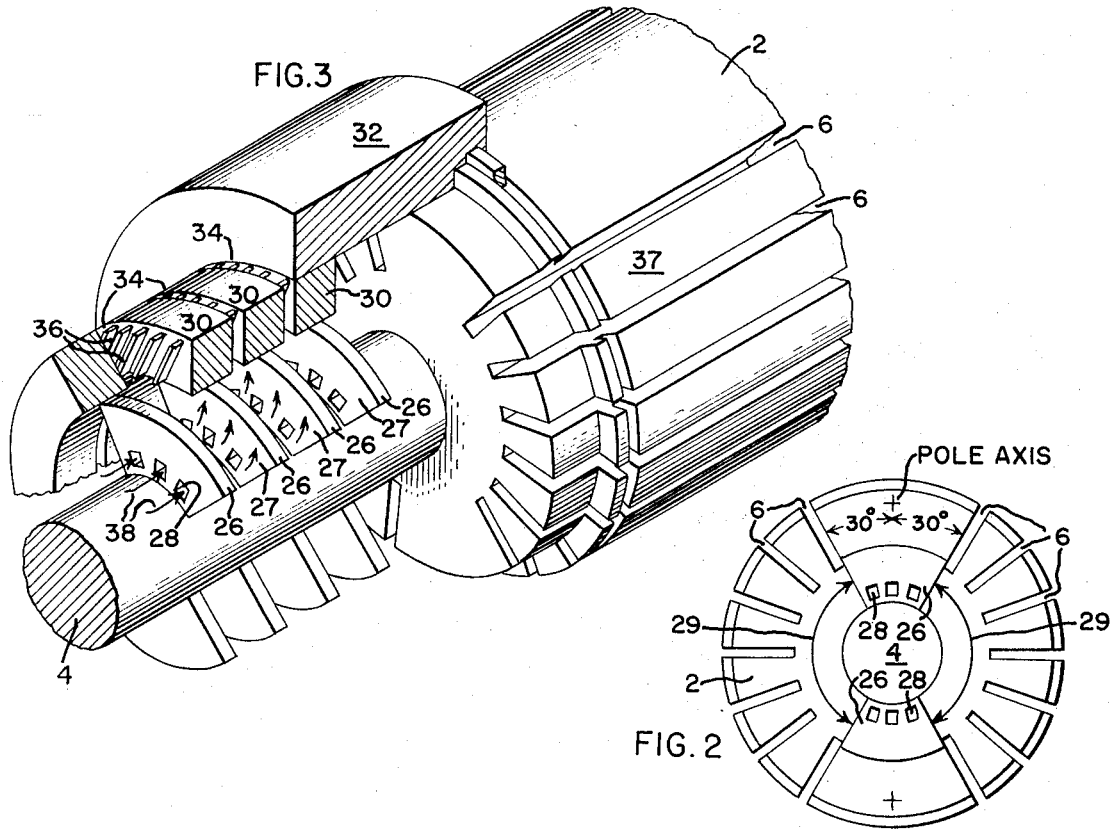

ROTOR FOR A DYNAMOELECTRIC MACHINE

BACKGROUND OF THE INVENTION

1. Field of the Invention

This invention relates to a dynamoelectric machine, and more particularly to an improved rotor structure therefor.

2. Description of the Prior Art

Dynamoelectric machines of the type comprising a rotor which carries coils made of conducting material are well known in the art. The capacity of such dynamo-electric machines to produce maximum power is normally directly proportional to the current carrying capacity of the coils. It is possible, then, to make a higher capacity dynamoelectric machine by increasing the amount of current capable of being carried by the coils. This may be accomplished either by increasing the quantity of conducting material, by increasing the diameter of the rotor, or by increasing the current carrying capacity of a given quantity of conducting material. The former approach is limited by the stresses due to the centrifugal force to which the rotor parts are subjected during operation of the machine, since an increase in rotor diameter greatly increases these stresses. The latter approach is limited by the fact that the greater the amount of current the coils carry, the more heat they generate. With the generation of additional heat, more sophisticated cooling systems are necessary, with the required sophistication necessarily causing a decrease in the reliability of the dynamoelectric machine.

The diameter of the rotors of dynamoelectric machines known in the art is limited by the diameter of retaining rings used in the rotor. Retaining rings are used to hold the end sections of the coils in place against centrifugal force as the rotor turns. Militating against increasing the diameter of the retaining rings is their ability to withstand stresses induced by centrifugal force. Such rotors typically turn at high speeds and thus induce considerable stress in the retaining ring due to the weight of the retaining ring itself and the weight of the end sections of the coils.

The stress induced in the retaining ring due to centrifugal force increases with the square of the radius of the retaining ring and the end sections of the coils, according to well-known laws of physics. Increasing the thickness of the retaining ring as it is made larger in diameter only partially solves this problem, since it merely increases the weight of the retaining ring, thus increasing the stress due to the weight of the retaining ring. Such an increase in thickness will allow some increase to be made in rotor diameter, but eventually this will be limited also.

In order to overcome limitations on the rotor diameter due to this limitation on the diameter of the retaining rings, the present invention discloses making the rotor spindle smaller in diameter with respect to the rotor body than has been done in the prior art. According to the present invention, the coils have side portions which are disposed in axial slots in the rotor body. The end sections of the coils are offset radially inwardly, or "downset", and have downset portions which extend axially along the rotor spindle and arcuate end portions which extend circumferentially along the rotor spindle. Radially directed portions provide a current path between respective side portions and downset portions. Circumferentially directed flanges provide circumferentially directed slots between them through which the arcuate end portions extend, and the outer radius of the flanges is substantially the same as the outer radius of the arcuate end portions and the radial distance to the outside of the downset portions. Inner retraining ring means is then shrink fit over the flanges on the rotor spindle, thus holding the downset and arcuate end portions of the end sections against movement due to centrifugal force. A short outer ring is used to hold the radially directed portions against movement due to centrifugal force. By offsetting the end sections radially inwardly and using small diameter inner retaining ring means over the end sections only instead of having large diameter retaining ring means which extend over both the rotor body and the end sections, as was done in the prior art as shown in U.S. Pat. No. 3,075,104, issued to D. M. Willyoung and assigned to the assignee of the present invention, smaller retaining ring means can be used with a correspondingly larger rotor body.

Downset end sections for coils in dynamoelectric machines have been used in the prior art, such as is shown by U.S. Pat. No. 3,395,299 issued to Quay et al., and assigned to the assignee of the present invention. However, the new and improved rotor structure disclosed by the present invention has distinct advantages over prior art structure in which gradual downsetting of the end sections was shown.

One advantage of the rotor structure of the present invention is that downsetting is accomplished without necessitating modification of the rotor body; also, the amount of offsetting is limited only by the minimum size available for the rotor spindle due to structural requirements. Another advantage is that the structure of the present invention allows multiple retaining rings to be used without necessitating connections between individual retaining rings. Using a single large retaining ring, as is shown in the aforementioned patent issued to D. M. Willyoung, is not as efficient as using several smaller ones due to manufacturing tolerances in making a single, large retaining ring and the difficulty of shrink fitting a large retaining ring onto the end sections of the windings. The use of multiple retaining rings is known in the prior art, as is shown by U.S. Pat. No. 3,458,742 issued to Whitelaw et al. However, because the present invention enables each retaining ring to be shrink fit onto one of the circumferentially directed flanges, the necessity for providing connecting structure between retaining rings, as is shown in the aforementioned patent issued to Whitelaw et al., is eliminated. Any necessary cooling of the coil end sections is easily accomplished by providing cooling-gas passages in the circumferentially directed flanges and arranging individual conductors of each coil in a manner which effects maximum cooling gas contact with each conductor. Cooling flow is also enhanced by using multiple retaining rings since fan means may be easily included in each retaining ring to establish the flow of cooling gas over the coil end sections.

SUMMARY OF THE INVENTION

It is a general object of this invention to provide a new and improved rotor structure for a dynamoelectric machine.

It is another object of this invention to provide a new and improved rotor for a dynamoelectric machine in which the end sections of the coils are downset radially inwardly.

In one embodiment of the invention, a two-pole rotor is provided having a rotor body with axial slots therein and a rotor spindle having circumferentially directed flanges thereon which extend 30° to either side of the circumferential location of each pole axis. A plurality of coils, each having side portions, offset portions, and arcuate end portions, are provided. The side portions are disposed in the axial slots in the rotor body; the offset portions include downset portions which extend axially along the rotor spindle and radially directed portions which provide a current path between respective side and downset portions; and the arcuate end portions, whose outer radii are substantially equal to the radial distance to the outside edge of the downset portions, extend circumferentially along the rotor spindle and provide a current path between respective downset portions of each respective coil. The arcuate end portion of each coil extends through a circumferentially directed slot provided by the circumferentially directed flanges on the rotor spindle. The flanges have an outer radius which is substantially equal to the outer radius of the arcuate end portion of each coil. Inner retaining ring means, comprised of a plurality of ring members, is then shrink fit over the flanges so that each retaining ring member fits over one flange. A short outer ring is then shrink fit over the end of the rotor body and the inner retaining ring member closest to the end of the rotor body.

In order to provide for cooling flow to the parts of the arcuate end portions which are disposed in the circumferentially directed slots, axial cooling-gas passages are provided in the circumferentially directed flanges and the retaining ring members include fan means. The fan means draw cooling gas axially through the slots in the flanges and over the arcuate end portions of the coils. In order to facilitate cooling flow and allow maximum heat transfer from the arcuate end portions to the cooling gas, the individual conductors of each coil are of rectangular cross section and are disposed in the slots with the longer side of the rectangular cross section directed radially.

BRIEF DESCRIPTION OF THE DRAWINGS

A more complete understanding of this invention may be had by reference to the accompanying specification when taken in conjunction with the drawings of the invention, wherein:

FIG. 1 is an isometric view of a portion of a two-pole rotor of a dynamoelectric machine and coils thereon showing the relationship of the coils to the rotor body and rotor spindle.

FIG. 2 is an end view of the rotor showing the relationship of the circumferentially directed flanges to the pole axes of the rotor; coils and retaining ring members have been omitted from FIG. 2 for simplicity.

FIG. 3 is an isometric view of the rotor body and rotor spindle showing the relationship of the retaining ring members to the circumferentially directed flanges; coils have been omitted from FIG. 3 for simplicity.

DETAILED DESCRIPTION OF THE INVENTION

Figure 4:
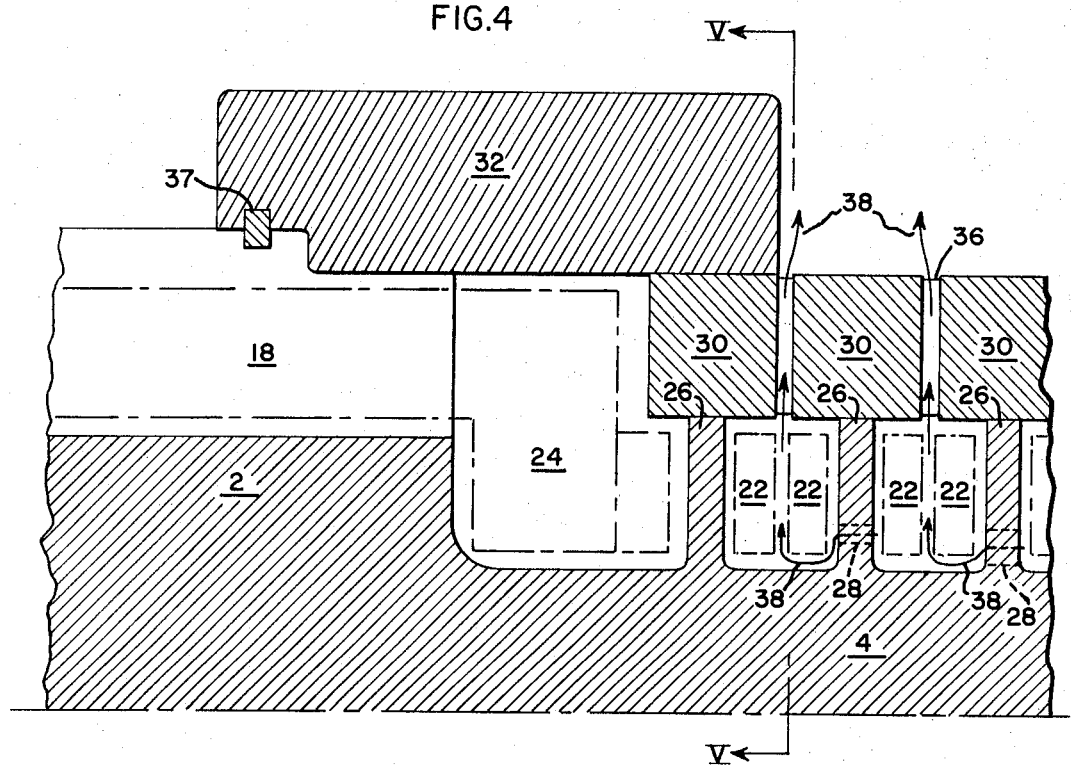
FIG. 4 is a sectional view of a portion of the rotor body and rotor spindle showing the relationship of the outer ring to the rotor.

Referring now to FIG. 1, there is shown a two-pole rotor having a rotor body 2 and a rotor spindle 4. Rotor body 2 has a plurality of axial slots 6 therein, only one of which is shown here for purposes of clarity.

Coil 8 is formed by four individual conductors 10, 12, 14 and 16 which are rectangular in cross section and have the longer side of the rectangular cross section disposed in a generally radial direction. It will be recognized by one skilled in the art that the use of four conductors is intended to be representative only and any number of conductors may be used without departing from the spirit of the invention. Each conductor of coil 8 includes side portion 18, offset portion 20 and arcuate end portion 22. Each side portion 18 is disposed in axial slot 6 in the rotor body 2. Each offset portion 20 includes a radially directed portion 24 and a downset portion 25, which latter downset portion 25 extends axially along rotor spindle 4. Each radially directed portion 24 provides a current path between side portion 18 and downset portion 25, but of course one skilled in the art may perceive other means for providing such a path without departing from the spirit of the invention. Arcuate end portion 22 extends circumferentially along rotor spindle 4 and has an outer radius substantially equal to the radial distance to the outside edge of downset portion 25. One skilled in the art will recognize that FIG. 1 represents only a portion of a typical rotor coil. Each coil will typically include a second side portion disposed in a second axial slot at another circumferential location on the rotor body and this second side portion will have a corresponding offset portion, with the arcuate end portion providing a current path between the offset portions. It will be recognized also that the end structure of the coil, including the offset portions and the arcuate end portions, will typically be repeated in an appropriate manner at the other end of the rotor.

Circumferentially directed flanges 26, having an outer radius smaller than the radius of rotor body 2 and substantially equal to the outer radius of arcuate end portions 22, are formed integrally with rotor spindle 4. Flanges 26 might also be formed separately and welded, or otherwise secured, to spindle 4 without departing from the invention. Circumferentially directed slots 27 are provided between adjacent flanges 26. Flanges 26 may have axial cooling-gas passages 28 therein, although these are not necessary for some cooling flow patterns.

Referring to FIG. 2, the location of slots 6 and circumferentially directed flanges 26 with respect to the pole axes of the rotor is shown. In order to simplify the construction of flanges 26, they extend in a minor arc, here selected as 30° since that is the angular location of the axial slot 6 nearest to the pole axes, to either side of the circumferential location of the respective pole axes rather than entirely around the circumference of rotor spindle 4. By centering flanges 26 on the pole axes and having them extend in an arc 30° to either side thereof, axial recesses 29 are formed by the rows of diametrically opposed flanges. It will be readily seen by one skilled in the art that flanges 26 may be either extended entirely around the circumference of rotor spindle 4, as long as provision is made for the downset portions 25 to pass through such flanges, or made to extend less than 30°, as long as provision is made for the stresses to which they are subject. It is also apparent that this structure is readily adaptable for use with other than a two-pole rotor without departing from the spirit of the invention.

Figure 5:
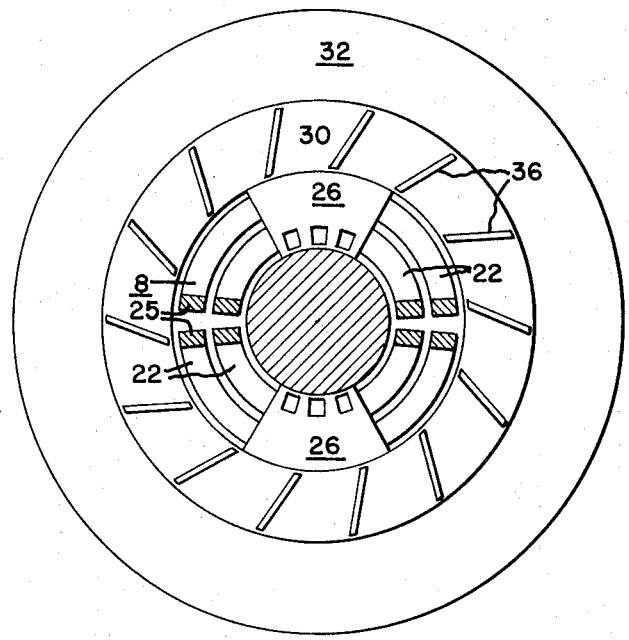
FIG. 5 is a sectional view of the rotor taken along line V—V in FIG. 4.

Referring now to FIGS. 3, 4 and 5, wherein the same reference numerals refer to the same parts designated in FIGS. 1 and 2, the completed structure of the rotor according to the present invention is seen. With coils 8 all in place, inner retaining ring means, comprised of a plurality of ring members 30, is shrink fit over circumferentially directed flanges 26 so that ring members 30 encircle rotor spindle 4 and overlie flanges 26 in a manner whereby each ring member 30 overlies only one flange. Inner retaining ring means is shown as including a plurality of ring members 30, but the present invention contemplates a single small diameter, retaining ring as being within its scope. Fan means 34, forming a part of ring members 30, is comprised of a series of fan blades 36 suitably mounted to or cut into each ring member 30. A short, large diameter outer ring 32 is shrink fit onto the rotor so that it overlies the end of rotor body 2 and the ring member 30 closest to rotor body 2. Ring 32 is secured to rotor body 2 by a key-in-slot arrangement 37, or by other suitable means. Outer ring 32 need only be long enough to hold radially directed portions 24 of the coils (see FIG. 1) against radial movement due to centrifugal force. Outer ring 32 may be made larger in diameter than the inner retaining ring means since it is not subject to the stresses due to centrifugal force acting on the arcuate end portions as is the inner retaining ring means. Outer ring 32 need only withstand stresses due to centrifugal force from its own weight plus that of radially directed portions 24 of each coil 8, the stress due to radially directed portions 24 being considerably less than that due to the centrifugal force acting on arcuate end portions 22. While the size of outer ring 32 will eventually be limited by its own weight, this limit is reached at a much larger radius than can be obtained with a retaining ring which also must constrain arcuate end portions 22 against centrifugal force.

Any cooling of the arcuate end portions disposed in slots 27 which may be necessary may be effected by the provision of cooling-gas passages 28, as is best seen by again referring to FIGS. 3, 4 and 5 or alternatively through baffling members (not shown) directing gas circumferentially between flanges 26. Fan means 34 draws cooling gas, the flow of which is represented by arrows 38, axially through the volume between rotor spindle 4 and ring members 30. Those parts of arcuate end portions which are disposed in axial recesses 29 and the downset portions, which are also disposed in axial recesses 29, (see FIG. 5) are thereby exposed to cooling gas. Axial passages 28 may facilitate cooling gas in reaching the parts of arcuate end portions disposed in slots 27. The orientation of the conductors in slots 27 allows cooling gas to contact each of the conductors as it moves circumferentially through slots 27 and then radially through the conductors. Note that by using conductors of rectangular cross section and disposing the conductors, at least in slots 27 where cooling gas flow is restricted, so that the longer side of the rectangular cross section is disposed radially, more conductor surface area is exposed to the cooling gas than in the conventional manner in which the rectangular conductors are "stacked". More efficient cooling allows more current to be passed through the conductors, thus increasing the capacity of the dynamoelectric machine.

Although only one specific embodiment of the invention has been shown, those skilled in the art will perceive modifications other than those specifically pointed out which can be made without departing from the invention, and it is intended by the appended claims to cover all such modifications as fall within the true spirit and scope of the invention.

What I claim as new and desire to be secured by Letters Patent of the United States is:

1. A rotor for a dynamoelectric machine, the rotor comprising:
 a. a rotor body having axial slots therein;
 b. a rotor spindle coaxial with, and having a smaller diameter than, said rotor body;
 c. a plurality of coils each having side portions, offset portions and arcuate end portions;
  i. said side portions being appropriately disposed in said axial slots,
  ii. each of said offset portions including:
   A. a downset portion extending axially along said rotor spindle, said downset portion having an outside edge at a predetermined radial distance from the axis of the spindle, and
   B. means for providing a current path between said respective side portions and said respective downset portions, and
  iii. each of said arcuate end portions extending circumferentially along said rotor spindle to provide a current path between respective downset portions, and each of said arcuate end portions having an outer radius substantially equal to said predetermined radial distance to the outside edge of said downset portions; and
 d. a plurality of circumferentially directed flanges on said rotor spindle, said flanges providing circumferentially directed slots through which said respective arcuate end portions extend, and said respective flanges having an outer radius substantially equal to the outer radius of said arcuate end portions; and
 e. inner retaining ring means encircling said rotor spindle and overlying said circumferentially directed flanges.

2. The rotor recited in claim 1 further including an outer ring encircling said rotor and overlying a portion of said rotor body and a portion of said inner retaining ring means.

3. The rotor recited in claim 1 wherein said inner retaining ring means is comprised of a plurality of ring members, each ring member overlying only one of said circumferentially directed flanges.

4. The rotor recited in claim 3 further including an outer ring encircling said rotor and overlying a portion of said rotor body and one of said inner retaining ring members.

5. The rotor recited in claim 1 wherein:
 a. the rotor is a two-pole rotor; and
 b. each said circumferentially directed flange extends in a 30° arc to either side of the circumferential location of the respective pole axes.

6. The rotor recited in claim 1 wherein:
 a. said circumferentially directed flanges have axial cooling-gas passages therethrough;
 b. said arcuate end portions comprise a plurality of conductors, each said conductor being rectangular in cross section and being disposed in said circumferentially directed slots with the longer side of said rectangular cross section disposed in a generally radial direction; and c. said inner retaining ring means include fan means for drawing cooling gas through said cooling-gas passages in said circumferentially directed flanges, into said circumferentially directed slots, and over said arcuate end portions disposed in said circumferentially directed slots.

7. The rotor recited in claim 4 wherein:
a. said circumferentially directed flanges have axial cooling-gas passages therethrough;
b. said arcuate end portions comprise a plurality of conductors, each said conductor being rectangular in cross section and being disposed in said circumferentially directed slots with the longer side of the rectangular cross section disposed in a generally radial direction; and
c. said ring members each include fan means for drawing cooling gas through said cooling-gas passages in said circumferentially directed flanges, into said circumferentially directed slots, and over said arcuate end portions disposed in said circumferentially directed slots.

8. The rotor recited in claim 7 wherein:
a. the rotor is a two-pole rotor; and
b. each said circumferentially directed flange extends in a 30° arc to either side of the circumferential location of the respective pole axes.

9. A rotor for a dynamoelectric machine, the rotor comprising:
a. a rotor body having at least two pole axes, said rotor body having a plurality of axial slots therein, said axial slots closest to said pole axes being angularly displaced a minor arc therefrom;
b. a rotor spindle coaxial with said rotor body;
c. a plurality of circumferentially directed flanges on said rotor spindle, wherein:
   i. said circumferentially directed flanges define circumferentially directed slots therebetween,
   ii. said circumferentially directed flanges are centered on respective pole axes and extend to either side thereof an angular distance no greater than said minor arc to define axial recesses along said rotor spindle, and
   iii. said circumferentially directed flanges have an outer radius smaller than the radius of said rotor body;
d. a plurality of inner retaining ring members, each said inner retaining ring member encircling said rotor spindle and overlying one of said circumferentially directed flanges;
e. an outer ring encircling said rotor and overlying the end portion of said rotor body and one of said inner retaining ring members;
f. a plurality of coils, each having side portions appropriately disposed in said axial slots, offset portions including downset portions disposed in said axial recesses and radially directed portions providing a current path between said respective side portions and respective downset portion, said radially directed portions being held against radial movement by said outer ring, and arcuate end portions at least partially disposed in said circumferentially directed slots, said arcuate end portions providing a current path between respective downset portions, said arcuate end portion and said downset portions being held against radial movement by said inner retaining ring members.

10. The rotor recited in claim 9 wherein said minor arc is substantially equal to 30°.

11. The rotor recited in claim 9 wherein:
a. said circumferentially directed flanges have axial cooling-gas passages therethrough;
b. said arcuate end portions comprise a plurality of conductors, each said conductor being rectangular in cross section and being disposed in said circumferentially directed slots with the longer side of the rectangular cross section disposed in a generally radial direction; and
c. said inner retaining ring members each include fan means for drawing cooling gas through said axial cooling-gas passages in said circumferentially directed flanges, into said circumferentially directed slots, and over said arcuate end portions disposed in said circumferentially directed slots.

* * * * *